May 5, 1936. W. A. BLACK 2,039,517
FOCAL PLANE SHUTTER
Filed July 19, 1935 5 Sheets-Sheet 1
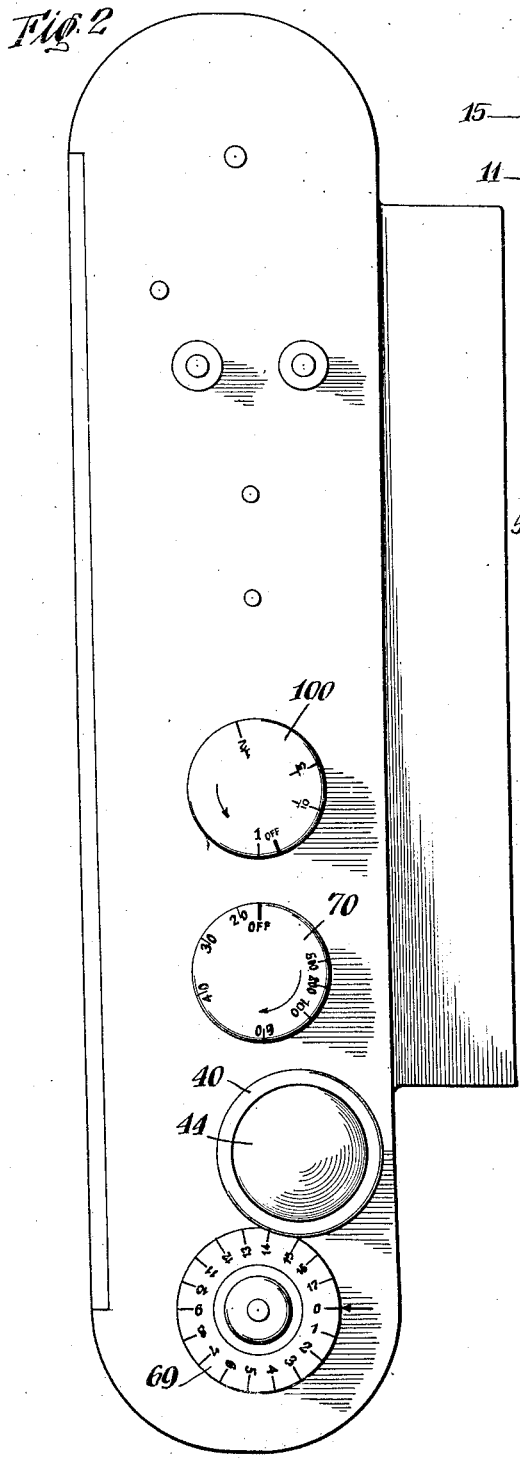
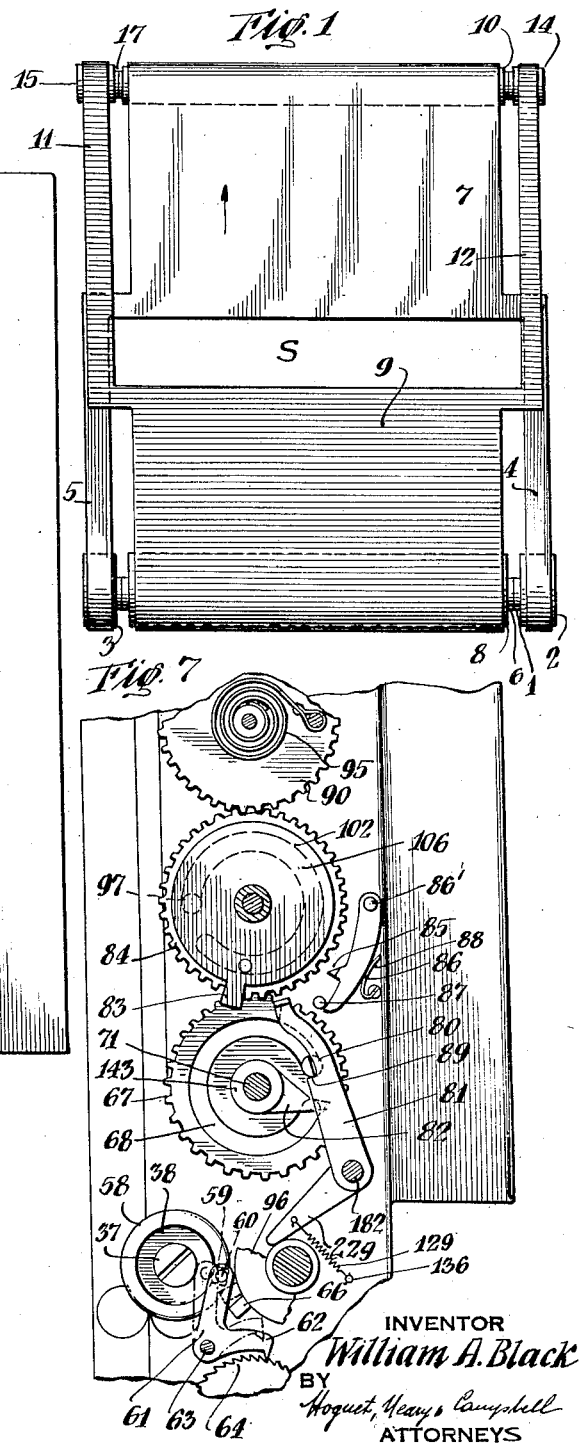
INVENTOR
William A. Black
BY
Hoguet, Neary & Campbell
ATTORNEYS May 5, 1936.  W. A. BLACK  2,039,517
FOCAL PLANE SHUTTER
Filed July 19, 1935  5 Sheets-Sheet 2
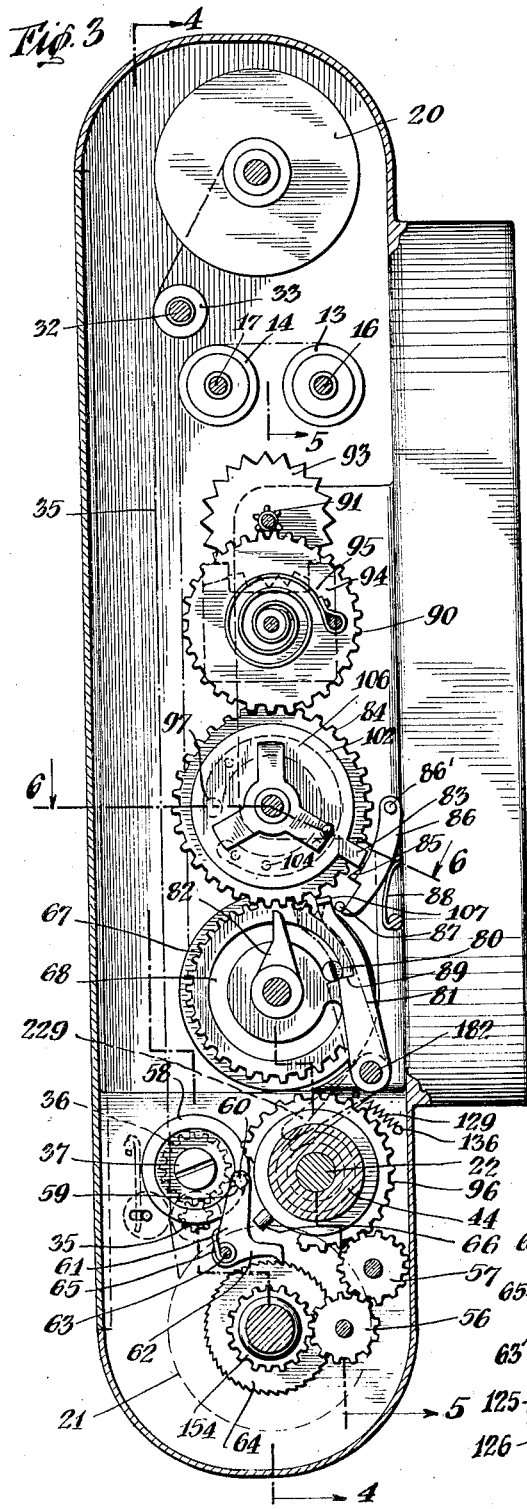
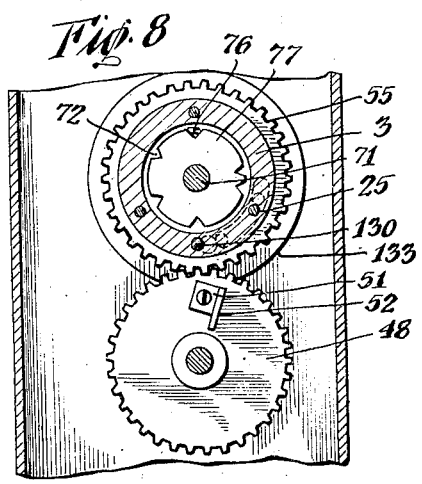
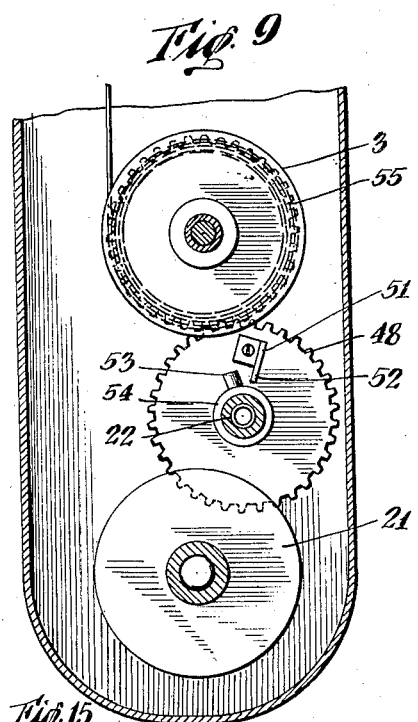
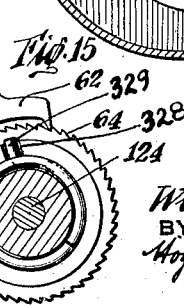
INVENTOR
*William A. Black*
BY
*Hoguet, Neary & Campbell*
ATTORNEYS

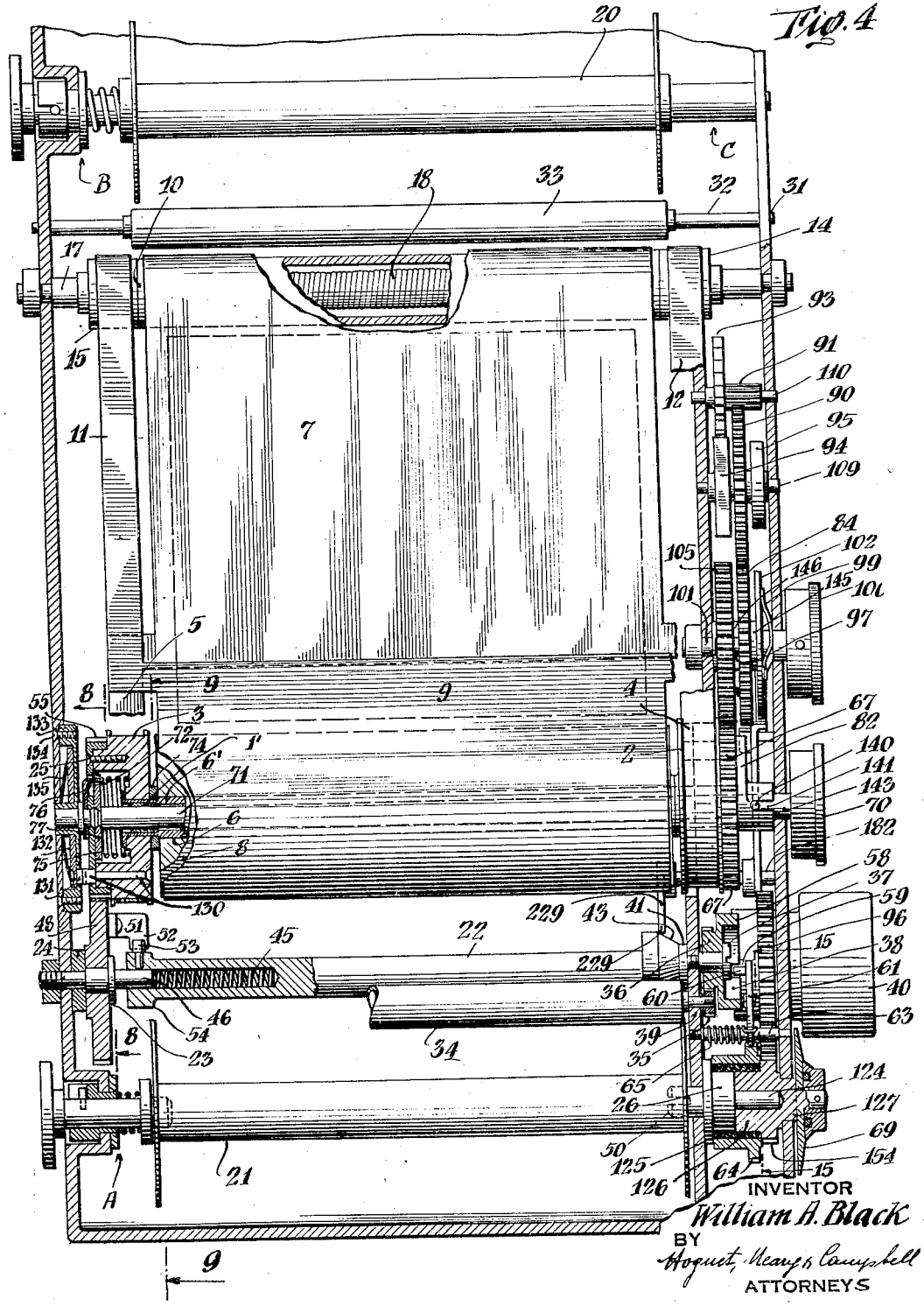

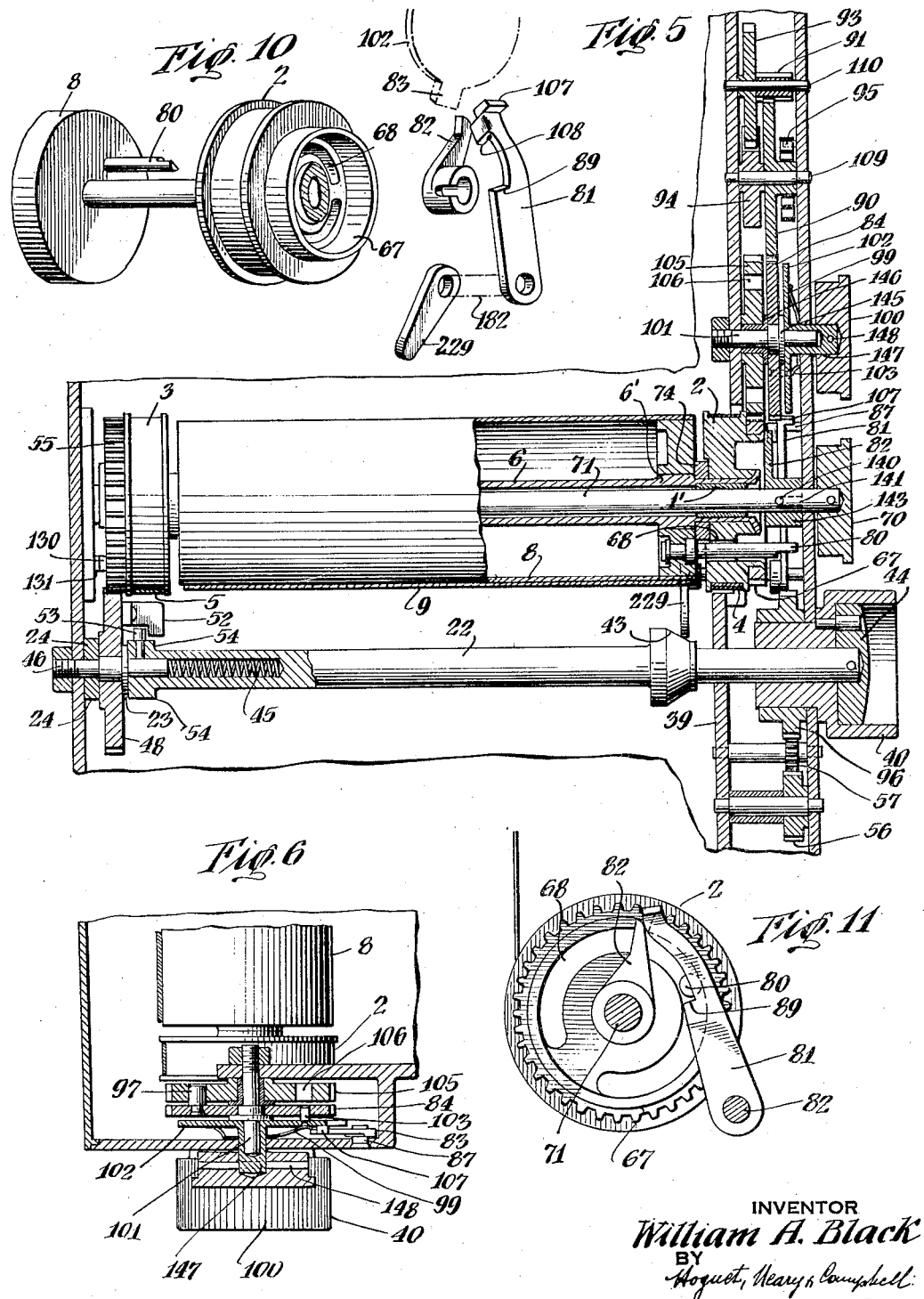
May 5, 1936.  W. A. BLACK  2,039,517
FOCAL PLANE SHUTTER
Filed July 19, 1935  5 Sheets-Sheet 4
INVENTOR
William A. Black
BY
ATTORNEYS

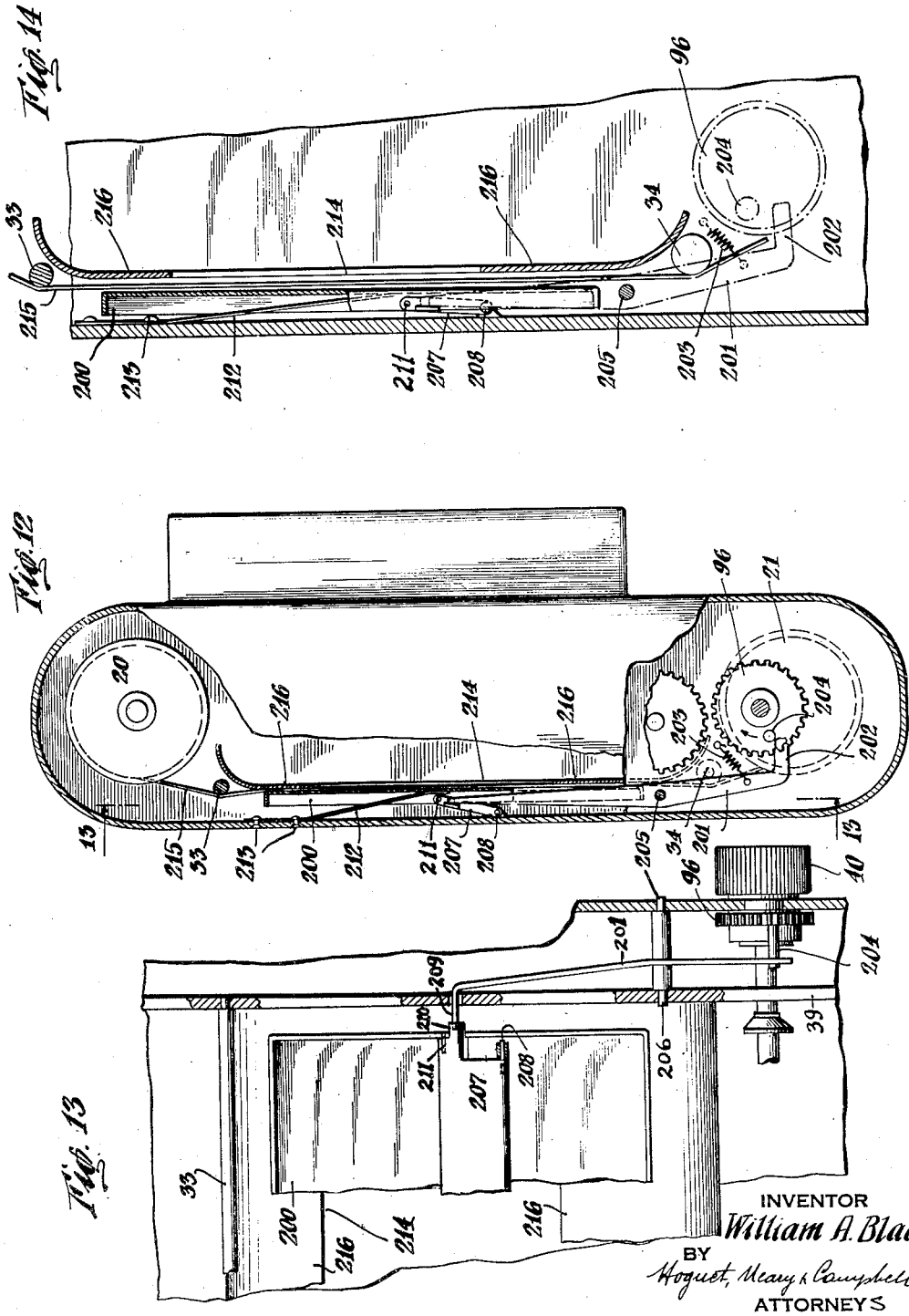

Patented May 5, 1936

2,039,517

UNITED STATES PATENT OFFICE 2,039,517

FOCAL PLANE SHUTTER

William A. Black, Montclair, N. J., assignor to Fairchild Aerial Camera Corporation, Woodside, N. Y., a corporation of New York Application July 19, 1935, Serial No. 32,139

24 Claims. (Cl. 95—31)

This invention relates in general to focal plane camera shutters and more particularly to self-capping shutters having an adjustable slit between the adjacent ends of the leading and following blinds.

I am aware of the fact that it is old in the art to provide a self-capping focal plane shutter, or in other words a shutter in which the exposure slit is automatically closed after it completes its travel across the focal plane of the lens and remains closed during the resetting or return movements of the blinds. In such an arrangement, when the shutter is released the leading blind travels across the focal plane of the lens in advance of the following blind, the driving bands of the leading blind mounted on reels on the same axis about which the drum of following blind is free to rotate. Thus, upon a release of the shutter the leading blind first unwinds a distance equivalent to the width of the exposure slit, whereupon the following blind is released, one of the two blinds and the bands of the other being wound upon their respective take-up drums. When the shutter is rewound, the two blinds move as a single unit without a slit between their adjacent ends.

One object of the invention is to provide improved construction whereby the width of the exposure slit between the adjacent ends of the leading and following blinds is adjustable over a wide range.

Another object of the invention is to provide improved metering means for insuring the advancing of the proper amount of film for the next exposure during the rewinding of the shutter.

Another object is to provide improved means of braking and stopping the movement of the leading and following blinds upon completion of their travel across the focal plane of the lens just after the ends of the blinds have cleared the focal plane of the lens so that this movement of the blinds will be completed before the reels, on which the driving bands of leading blind are wound and the drum on which the following blind is wound, have made a complete revolution.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in top plan of the two blinds forming the shutter, showing the exposure slit therebetween.

Figure 2 is a view in side elevation of the camera showing slow and high speed dial settings, winding and tripping knob and exposure indicator.

Figure 3 is a view similar to Figure 2 with the side cover removed.

Figure 4 is a view in section taken along the line 4—4 of Figure 3.

Figure 5 is a view in section taken along the line 5—5 of Figure 3.

Figure 6 is a view in section taken along the line 6—6 of Figure 3, showing a slow speed shutter setting.

Figure 7 is a fragmentary view similar to Figure 3 showing part of the mechanism in another position.

Figure 8 is a view in section taken along the line 8—8 of Figure 4, showing a fast speed shutter setting.

Figure 9 is a view in section through the film feeding mechanism and taken along line 9—9 of Figure 4.

Figure 10 is a view in perspective, partly broken away, showing the drum on which the following blind is wound and the reel on which one bank of leading blind is wound, and also the arm for tripping the following blind.

Figure 11 is a detail view in elevation of the assembled parts of Figure 10 in operating position.

Figure 12 is a view in side elevation of the camera with the side cover partly removed to show the pressure plate and the control means therefor in the position assumed at the end of the winding cycle.

Figure 13 is a view in section taken along line 13—13 of Figure 12.

Figure 14 is a view similar to Figure 12 showing the positions of the parts assumed during the winding cycle of film and shutter.

Figure 15 is a detail view in section showing the clutch mechanism for the measuring roll.

Referring more particularly to the drawings, Figure 1 generally illustrates the focal plane shutter comprising a leading blind 7 and a following blind 9. During the exposure operation the leading blind 7 and the following blind 9 are moved in the direction indicated by the arrow leaving an exposure slit S between their adjacent ends. Upon completion of their travel across the focal plane of the lens the slit S is automatically closed and remains closed during the resetting or return movement of the blinds.

Obviously in order to provide a slit S of a definite width for a given time interval and to automatically close the slit S for its return movement across the focal plane of the lens, it is necessary to provide escapement mechanism or similar devices for bringing about a predetermined lost motion between the movements of the blinds so that the desired width of the slit may be obtained. The means for accomplishing this over a wide range of shutter speeds will become more apparent upon a further reading.

Referring to Figures 1 and 4, means are generally shown at A, B, C and D for holding film spools 20 and 21 in position. On a hollow shaft 6, and fixed thereto are reels 2 and 3 upon which are wound the driving bands 4 and 5 of the leading blind 7. The drum 8 idles on an enlarged portion 6' of the shaft 6, there being provided some clearance between the reels 2 and 3 and the drum 8 maintained by means indicated at 74. One end of the following blind 9 is cemented to the drum 8. Fixed to a shaft 17 is a drum 10 on which the leading blind 7 is wound, one end of blind 7 being cemented to the drum 10. The driving bands 11 and 12 of the following blind 9 are wound on a drum 13 mounted on a shaft 16 located directly in back of shaft 17 carrying drum 10. These driving bands ride on idlers 14 and 15 loosely mounted on the shaft 17. The driving bands 11 and 12 of following blind 9 and the leading blind 7 are wound on the drum 13 and the drum 10 respectively subject to the tension of torsion springs, one of which is indicated at 18 located within the drum 10, a similar one being located within the drum 13. By this arrangement each blind may be moved independently of the other. In the fully unwound position of the shutter the leading blind 7 is wound up on the drum 10 and the driving bands 4 and 5 are therefore unwound from the reels 2 and 3 and the driving bands 11 and 12 of the following blind 9 are wound on the drum 13 and therefore the following blind 9 is unwound from the drum 8. The slit S, of predetermined width, between the adjacent ends of blinds 7 and 9 is controlled during its travel across the focal plane of the lens from the wound position to the unwound position and is closed when the shutter is in the fully unwound position and remains in this light tight relationship during the rewinding operation by means about to be described.

To rewind the shutter after an exposure, the knob 40 is rotated in a clockwise direction. This knob is fixed to a shaft 22 having at its other end an enlarged portion 54 carrying a pin 53 engaging a projection 52 on an arm 51. The arm 51 is fixed to the face of a gear 48 loosely mounted on a stub shaft 46, the gear 48 being held in place on the stub shaft by means of collars 23 and 24. The gear 48 meshes with a gear 55 fixed to the face of reel 3 by means of screw bolts 25. Thus a clockwise rotation of the knob 40 rotates the gear 55 and the reels 2 and 3 in a counterclockwise direction, winding the driving bands 4 and 5 thereon and thus unwinding the leading blind 7 from drum 10 against the tension of spring 18. Simultaneously, the following blind 9 is wound on the drum 8 and thus the driving bands 11 and 12 are unwound from the drum 13 against the tension of the spring within the drum 13. This is brought about by the action of a pin 80 fixed to the face of the drum 8 and extending through the reel 2 and the slotted portion 68 of gear 67 (see Figures 3, 5, 7 and 11), the gear 67 being fixed to the face of the reel 2. The pin 80, in this position is at the extreme end of slot 68 of gear 67, as shown in Figures 6 and 7. Thus, as the knob 40 is rotated in a clockwise direction imparting a counter-clockwise movement to gear 55 and thus to reels 2 and 3 and gear 67, drum 8 is carried along so as to rewind the following blind 9 thereon. Operating simultaneously with this winding operation are means for advancing the proper amount of film for the next exposure.

Shown at 34 is a film metering shaft bearing in the camera frame at one end and through the partition 39 at the other end. This shaft carries a pinion 35 in mesh with a gear 36 integral with a wheel 58 loosely mounted on a screw shaft 37 carried by the partition 39. The wheel 58 is recessed at 38 and has a slot 59 normally receiving a pin 60 projecting from an arm 61 pivoted at 63. Integral with the arm 61 is a pawl 62 normally urged by the action of a spring 65 into engagement with a ratchet 64 of a clutch mechanism. Loosely mounted on a stub shaft 124 of the clutch mechanism is a gear 154 in gear relationship with a gear 96, which is fixed to the winding knob 40, by means of the intervening pinions 56 and 57. These pinions cause the gear 154 to be driven in a counter-clockwise direction as the rewinding operation is carried out by rotating the knob 40 in a clockwise direction. On the gear 96 is a projection 66 so located that upon rotation of gear 96 the projection 66 engages the arm 61 disengaging pin 60 from slot 59. The pin 60 moves inwardly and rides within the recessed portion of wheel 58. At the same time the pawl 62 is disengaged from the ratchet 64, both movements taking place against the tension of a spring 65. When this action occurs the sprocket 50 on the shaft 124, engaging the film winding spool 21 is turned by the action of a square cut spring 125 of a clutch mechanism engaging an extended portion 126 of the gear 154 and the hub 26 of the shaft 124. This action is brought about by reason of the fact that the square cut spring 125 has an extension 329 engaging a slot 328 in the ratchet wheel 64 and is coiled in a clockwise direction, there being a close fit between the spring and the hub 26 and the extension 126. Thus, when the pawl 62 is out of engagement with the ratchet 64 the rotation of the gear 154 is with the action of spring 125. Thus it tightens the spring and thereby grips the extension 126 and the hub 26, thus rotating the ratchet wheel 64 and the shaft 124 in a counter-clockwise direction. When the pawl 62 is in engagement with the ratchet 64, the latter is held stationary and the rotating gear 154 is against the action of the spring 125. Thus the spring is expanded, thereby releasing the grip of the spring on the extension 126 and the hub 26 and so the gear 154 rotates without rotating the shaft 124. This allows the film to be drawn from the film feeding spool 20 onto the film winding spool 21 over the metering shaft 34, the latter being permitted to rotate because pin 60 has been disengaged from slot 59. The pin 60 is caused to bear outwardly against the recessed surface of wheel 58 due to action of spring 65. The metering shaft 34 continues to be rotated, by film passing over it, until pin 60 of the arm 61 again drops into slot 59 after a complete revolution thereby stopping the rotation. The pivotal movement of the pin 61, thus caused, brings the pawl 62 into engagement with the ratchet 64. This stops the rotation of the shaft 124 carrying sprocket 50 by releasing the grip of the square cut spring 125 from the extended portion 126 of the gear 154, and the hub 36, allowing the gear 154 to rotate freely. By this means the exact amount of film is advanced during each shutter rewinding operation. On another extension 127 of gear 154 may be another gear in mesh with a gear in the exposure indicator 69 whereby the operator can tell the exact number of exposures that have been made.

Assuming that both the high speed knob 70 and the low speed knob 100 are in the off position, the shutter is then set for a time exposure. The settings for the various speeds can only be changed when the shutter is in position ready to be tripped and the speed setting not being used must be in the off position. The low speed setting is retained in the off position by rotating the knob 100 in a clockwise direction until a projection 83 on a disc 102 is in engagement with a projection 85 on an arm 86 pivoted at 86' to the casing. A stationary pin 87 limits the movement of the arm 86 in one direction, arm 86 being urged in this direction by the action of a spring 88. The projection 83 on the disc 102 is prevented from being rotated past the catch 85, in clockwise direction, by a pin on the upper face of a gear 84 engaging a pin on the lower face of disc 102. In this position the disc 102 is prevented from rotating and coming in contact with a projection 107 of the arm 81 so as to release the following blind 9. Gear 105 which is in mesh with the gear 67 on the reel 2 rotates back and forth, during this time exposure operation, the length of the slot 106 in the gear 105, the slot being engaged by the pin 97 on the lower face of the gear 84. Releasing arm 82, of the high speed setting loosely carried on the shaft 71 by the shaft 143, is kept from engagement with the projection 108 of the arm 81 due to its setting, in the off position, with relation to the slot 68 in the gear 67, being at a point farthest away from the projection 108, and stopped from reaching the same by the action of a stop and braking means to be described later.

The shutter is tripped in the following manner. An arm 229 is fixed to a shaft 182, to which another arm 81 is fixed. The arm 229 bears against the inclined surface of a cone 43 fixed to the shaft 22. The shaft 22 is slidably mounted on the stub shaft 46 against the action of a compression spring 45 and is moved against the action of this spring upon depressing the button 44 located in the winding knob 40. Upon depressing the button 44 the arm 229 follows down along the face of the cone 43 by the action of a spring 129. This moves the notch 89 on the arm 81 into engagement with the pin 80. Simultaneously with this movement the pin 53 is moved out of engagement with the projection 52, as shown in Figure 5, thereby releasing the reels 2 and 3 carrying the driving band 4 and 5 of the leading blind 7. The pin 80, being in engagement with a notch 89 on the arm 81, the drum 8 of the following blind 9 is kept from rotating, the reel 2 and gear 67 being free to rotate around the pin 80 by means of the slot 68 of the gear 67. Upon releasing the button 44 the pin 53 is returned to position for engagement with the projection 52 of the arm 51 and into position for rewinding. At the same time the arm 229 rides up the face of the cone 43, pushing the notch 89 on the arm 81 out of engagement with the pin 80, against the tension of the spring 129 and thereby releasing the following blind 9, the pin 80 riding around to the other end of the slot 68 in the gear 67. It will be noted that this action always takes place regardless of the speed setting. Therefore, the button 44 should always be kept depressed until the action is completed because in the slower speeds, such as one second, where the following blind is released by other means hereinafter described, the releasing of the following blind would be premature if the button were released too soon. It can now be readily seen how both blinds are rewound simultaneously from this position with the pin 80 in the above mentioned relation to the slot 68 in the gear 67. As the reels 2 and 3 are rotated in a counter-clockwise direction the drum 8 is carried along by the pin 80 bearing against the end of the slot 68.

The movement of the reels 2 and 3 and consequently of the leading blind 7 is braked and stopped by the action of a pin 130, on the face of gear 55, engaging another pin 131. The pin 130 is fastened to face of the gear 55 to engage another pin 131 fastened to a friction disc 132. The friction disc bears against the face of a housing 133, fastened to the camera wall by means of screws 134. The friction is obtained by the action of a flat spring 135. The pin 131 projects through a slot in the housing 133. The slot is short so as to limit the movement of the pin 131 and the disc 132 to an arc of about 30°. The stop and braking means is reset during the last movement of the rewinding operation and is effective as a stop and brake during the last part of the movement of both blinds after the tripping of the shutter. The leading blind is first braked and then the following blind.

With the shutter in the unwound position, the pin 131 and the disc 132 have been moved the farthest distance possible in a clockwise direction. The pin 131 is against the end of the slot in the housing 133. During the rewinding, the gear 55, carrying the pin 130 and the reel 3, is rotated in a counter-clockwise direction and away from the pin 131. Just before the rewinding operation is completed the pin 130 engages the pin 131 and carries it and the friction disc 132 along. When the pin 131 reaches the other end of the slot in the housing 133 the rewinding operation is just completed and the shutter is ready for another exposure. Upon tripping of leading blind, the gear 55 carrying the pin 130, moves in a clockwise direction. When the gear 55 has rotated nearly a complete revolution which is enough for the end of the leading blind 7 to clear the focal plane of the lens, the pin 130 engages the pin 131, moving it and the friction disc 132 in a clockwise direction and almost the length of the slot in the housing 133. This operation acts as a stop for the leading blind 7, allowing its end to just clear the focal plane of the lens, and the movement of the pin with the friction disc allows this stopping action to be gradual, thus relieving the strains from all the parts that would occur if this movement were not braked in the above manner. After the leading blind has completed its movement and is stopped, the pin 131 has not moved, in a clockwise direction, the total length of the slot due to the predetermined friction of the disc 132 bearing against the face of the housing 133 by action of the spring 135. This movement is completed by retarding and stopping the movement of the following blind after the completion of its movement across the focal plane of the lens by reason of the fact that the pin 80 on the face of drum 8 rotating in the slot 68 of the gear 67, fixed to the face of reel 2, comes in contact with the other end of the slot, the gear 67 being stationary at the time. Therefore the shock of pin 80 striking the end of the slot 68 in gear 67 is transmitted through the reels 2 and 3, the reel 3 carrying gear 55 on which is fixed the pin 130 already in engagement with the pin 131 on the friction disc 132, thus moving it the remaining distance in its slot.

Should a high speed setting be desired, means are provided for releasing the following blind 9 to cause a slit S of predetermined width between the adjacent ends of the blinds as they move across the focal plane of the lens, slow speed setting remaining in the off position. This means comprises an arm 82 loosely mounted on the shaft 71. The shaft 71 is solid and extends through the hollow shaft 6 bearing on bushings pressed into a recessed portion of shaft 6, as generally indicated at 1', on which are mounted the reels 2 and 3. This shaft 71 is free to rotate in shaft 6 except when a disc 77, fixed thereto and carrying notches 72, is in engagement with a pin 76 fixed, at a predetermined point, to the face of the gear 55. The tripping arm 82, being loosely mounted on the shaft 71, is carried along therewith by means of a pin 140 extending through the shaft 71 in an elongated slot 141 of the shaft 143 integral with the arm 82. The speed setting may be changed by pulling outwardly on the knob 70 so as to disengage the pin 76 from a notch 72 against the tension of a spring 75 and rotating in a clockwise manner, to the speed setting desired, as indicated on the face of the knob 70. By this movement the arm 82 is brought into the desired relationship with a projection 108 of the arm 81 and the closer this relationship is the higher the shutter speed. The tripping is done as before and the reels 2 and 3 allow the leading blind 7 to unwind the same as for time exposure. The arm 82 being pinned to the shaft 71 is carried along with it, due to the shaft 71 being in engagement with the reel 3 and the gear 55 by means of the notch 72 on the disc 77 engaging the pin 76 fixed to the face of gear 55 and retained by means of the spring 75. Therefore arm 82 is rotated in a clockwise manner until it strikes the projection 108 of the arm 81 thus disengaging the notch 89 of the arm 81 from the pin 80 thereby releasing the following blind 9 and the desired slit S is obtained between the adjacent ends of the blinds for the shutter speed selected. The following blind 9 continues to unwind until the pin 80 has reached the end of the slot 68, thereby closing the slit and again placing the blinds in light tight relation for rewinding.

For slow speed operation the high speed adjustment is turned to the off position, thus placing the arm 82 farthest away from its tripping projection 108 so that the movement of the gear 55 fixed to the reel 2, which rotates the shaft 71 by means of the disc 77 fixed to the end of shaft 71 with its notches 72 engaging the pin 76 fixed to the face of gear 55 and thus rotating the arm 82, which is fixed to shaft 71 by means of pin 140, is completed and stopped before the arm 82 can engage the projection 108.

The adjusting knob 100 is pulled outwardly, raising the projection 83 on the disc 102 above the projection 85 on the arm 86, releasing it therefrom. The knob 100 is then rotated in a counter-clockwise direction to the shutter speed desired, the speed being indicated on the face of the knob. At this point the pin 103 on the disc 102 is engaged with a perforation 104 in the gear 84 and is held in place by the action of the spring 99. Gears 105 and 84 are loosely mounted on the shaft 101 and are separated by collar 146. The disc 102 is loosely mounted on the shaft 101 by means of its hollow shaft 147, the adjusting knob 100 being fixed thereto by a pin 148. The gear 84 and the disc 102 are separated by a collar 145. On the under side of the gear 84 is a pin 97 fixed to engage a slot 106 in the gear 105. The gear 105 is in mesh with the gear 67 on the reel 2 and is stopped by the stop and braking means heretofore described. The gear 105 is free to rotate around a pin 97 by means of its slot 106. The gear 84 is kept from rotation in wound up position by the engagement of the pin 97 with the end of the slot 106 in the gear 105. When the shutter is tripped the same action occurs as for the time exposure for the leading blind 7, but as soon as the end of the slot 106 in the gear 105 moves away from the pin 97 on the gear 84, the latter begins to rotate in a counter-clockwise direction due to the action of the spring 95, the spring 95 having a predetermined tension and having additional tension applied to it during the setting operation depending upon the setting made. The spring 95 rotates the gear 84 through the gear 90, fixed to the shaft 109, gear 90 being in mesh with the gear 84. This rotation is retarded by action of a pallet 94 loosely mounted on the shaft 109, being in engagement with a star wheel 93 fixed on the shaft 110, the shaft 110 being rotated by the pinion 91 in mesh with the gear 90. By this means a constant rotation is insured for the gear 84 carrying the disc 102. The gear 84 carries the disc 102 with its projection 83 and moves around until the projection 83 strikes the projection 107 on the arm 81. This releases the pin 80 from engagement with the notch 89 on the arm 81, thus releasing the following blind 9. The disc 102 is prevented from further rotation by its engagement with the lug 107 on the arm 81, arm 81 being stopped by the pin 87. On rewinding the shutter the gear 84 and therefore the disc 102 do not move until end of the slot 106 in the gear 105, moving in a clockwise direction, comes around and picks it up and carries it back to its original position by means of the pin 97 in the gear 84. At faster speeds, such as one-fifth of a second, this is near the end of its movement, the pin on the gear 84 carrying the disc 102 being stopped sooner due to projection 83 coming in contact with lug 107 on the arm 81 in less time.

The relationship of all parts to the winding knob is such that operation does not start in rewinding, with the initial movement of the winding knob. This is to allow a means of releasing the film pressure plate to operate so that film will not be scratched in advancing, the film advancing occurring simultaneously with the rewinding of the blinds.

Figure 12 shows the pressure plate at the end of the winding cycle and holding the film firmly and evenly against the exposure plate and over the exposure opening.

Figure 14 shows the pressure plate during the winding cycle of the film and the shutter with the pressure plate in the raised position, thus allowing free movement of the film.

The pressure plate 200 is actuated by the lever 201 having at one end an arm 202 which is in the path of a pin 204 fixed to the face of the gear 96 on the winding knob. The lever 201 is pivoted at 205 in the camera frame at one point and at 206 in the auxiliary frame 39. The lever is maintained in the position shown in Figure 14 by the action of the spring 203.

The pressure plate 200 is retained by a link 207 pivoted at one end at 208 to the back plate of the camera and to the pressure plate at 211. The link 207 has a projection 210 which engages another projection 209 of the lever 201. A flat spring 212 is fixed to the back plate of the camera at 213 and at its other end slidably positioned under the link 207.

During the first movement of the winding knob 40, and before any movement of the film or the shutter takes place, the arm 202 of the lever 201 moves away from engagement with the pin 204 fixed to the face of the gear 96, allowing the spring 203 to exert a downward movement to this end of lever 201 and thus an upward movement of this lever at its other end, thus imparting an upward movement to the link 207 about its pivot points 208 and 211. Thus the pressure plate is raised against the tension of the spring 212 and away from the film 215 and the exposure plate 216. Just prior to the completion of the winding operation, the pin 204 engages the arm 202 of the lever 201, raising the lever and placing tension on the spring 203. As this occurs the spring 212 forces the pressure plate against the film. As the pin 204 moves away from the arm 202, the tension of the spring 213 pulls downwardly on the link 201 at one end causing an upward movement at the other end so as to raise the pressure plate against the action of the spring 212.

Loosely mounted at 31, in the camera frame, is a shaft 32 on which is fixed a film positioning drum 33. A similar drum is located at the other end in the back cover (not shown). Their purpose is to keep the film in a flat plane when the film is about exhausted on either film spools 20 or 21. By this means buckling of the film is prevented while the film is in the focal plane of the lens during the film advancing.

The film positioning rollers are so located as to be slightly above the exposure plate. In this manner the film is raised above the exposure plate when the pressure plate is in the position shown in Figure 14, but not high enough to come into contact with the pressure plate, and therefore the film does not drag across the exposure plate or the pressure plate and become scratched during the advancing of the film.

The pressure plate covers an area much larger than the exposure opening 214, thus assuring that the film 215 will be held in a perfectly flat position on the exposure plate 216 and over the exposure opening 214. The spring 212 causes uniform pressure to be exerted over the whole area.

I claim:

1. In a camera, a self-capping focal plane shutter, a leading blind and a following blind, means for moving said blinds independently of each other and for moving the same jointly with predetermined slits between their adjacent ends during the exposure operation and in light tight relation on return, and means for frictionally braking and stopping the movement of said blinds upon completion of their travel in one direction.

2. In a camera, a self-capping focal plane shutter, a leading blind and a following blind, means for moving said blinds independently of each other and for moving the same jointly with predetermined slits between their adjacent ends during the exposure operation and in light tight relation on return, means for advancing film, and metering means for predetermining the amount of film advanced, and means for braking and stopping the movement of said blinds upon completion of their travel in one direction.

3. In a film camera, a self-capping focal plane shutter, a leading blind and a following blind, means for moving said blinds independently of each other and for moving the same jointly with predetermined slits between their adjacent ends during the camera exposure operation and in light tight relation on return, and means for braking and stopping the movement of said blinds upon completion of their travel in one direction, and a retractable pressure plate and control means therefor for holding said film flat during the exposure operation.

4. In a camera, a self-capping focal plane shutter, a leading blind and a following blind, means for moving said blinds independently of each other and for moving the same jointly with predetermined slits between their adjacent ends during the exposure operation and in light tight relation on return, means for advancing film, and metering means for predetermining the amount of film advanced, and means for braking and stopping the movement of said blinds upon completion of their travel in one direction and a retractable pressure plate and control means therefor for holding said film flat during the exposure operation.

5. In a film camera, a self-capping focal plane shutter, a leading blind and a following blind, means for moving said blinds independently of each other including means for releasably holding said following blind against movement while moving said leading blind a predetermined distance, means for advancing film, means for releasing said following blind for movement jointly with said leading blind with a predetermined slit between their adjacent ends during the exposure operation, means for maintaining a constant speed of operation of said last named means, and means for bringing the adjacent ends of said blinds together in light tight relationship and rewinding them together and a pressure plate and control means therefor for holding said film flat during the exposure operation.

6. In a camera, a self-capping focal plane shutter, a leading blind and a following blind, means for moving said blinds independently of each other including means for releasably holding said following blind against movement while moving said leading blind for a predetermined distance, means for releasing said following blind for movement jointly with said leading blind with a predetermined slit between their adjacent ends during the exposure operation, means for maintaining a constant speed of operation of said last named means, means for closing said slit for rewinding said blinds in light tight relationship, and means for advancing film, and metering means for predetermining the amount of film advanced.

7. In a camera, a self-capping focal plane shutter, a leading blind and a following blind, means for moving said blinds independently of each other including means for releasably holding said following blind against movement while moving said leading blind for a predetermined distance, means for releasing said following blind for movement jointly with said leading blind with a predetermined slit between their adjacent ends during the exposure operation, means for maintaining a constant speed of operation of said last named means, means for closing said slit for rewinding said blinds in light tight relationship, and means for frictionally braking and stopping the movement of said blinds upon completion of their travel in one direction.

8. In a film camera, a self-capping focal plane shutter, a leading blind and a following blind, means for moving said blinds independently of each other including means for releasably holding said following blind against movement while moving said leading blind a predetermined distance, means for advancing film, means for releasing said following blind for movement jointly with said leading blind with a predetermined slit between their adjacent ends during the exposure operation, said last named means being capable of a plurality of adjustments for varying and determining the width of said slit, means for closing said slit for rewinding said blinds in light tight relationship and a retractable pressure plate and control means therefor for holding said film flat during the exposure operation.

9. In a camera, a self-capping focal plane shutter, a leading blind and a following blind, means for moving said blinds independently of each other including means for releasably holding said following blind against movement while moving said leading blind a predetermined distance, means for advancing film, means for releasing said following blind for movement jointly with said leading blind with a predetermined slit between their adjacent ends during the exposure operation, said last named means being capable of a plurality of adjustments for varying and determining the width of said slit, means for maintaining a constant speed of operation of said last named means, and means for closing said slit for rewinding said blinds in light tight relationship, means for advancing film and metering means for predetermining the amount of film advanced, and means for frictionally braking and stopping the movement of said blinds upon completion of their travel in one direction during the exposure operation.

10. In a film camera, a focal plane shutter, a leading blind and a following blind and means for moving said blinds across the exposure area, means for advancing film, manually controlled means for releasing the leading blind and holding the following blind against movement, said following blind being adapted to be released for movement upon the release of said manually controlled means and a pressure plate and control means therefor for holding said film flat during the exposure operation.

11. In a camera, a self-capping focal plane shutter, a leading blind and a following blind, means for moving said blinds independently of each other including means for releasably holding said following blind against movement while moving said leading blind a predetermined distance, means for releasing said following blind for movement jointly with said leading blind with a predetermined slit between their adjacent ends during the exposure operation, means for maintaining a constant speed of operation of said last named means, means for closing said slit for rewinding said blinds in light tight relationship, means for advancing film, metering means for predetermining the amount of film advanced, and means for braking and stopping the movement of said blinds upon completion of their travel in one direction.

12. In a film camera, a self-capping focal plane shutter, a leading blind and a following blind, means for moving said blinds independently of each other including means for releasably holding said following blind against movement while moving said leading blind a predetermined distance, means for advancing film, means for releasing said following blind for movement jointly with said leading blind with a predetermined slit between their adjacent ends during the exposure operation, means for maintaining a constant speed of operation of said last named means, means for closing said slit for rewinding said blinds in light tight relationship, means for braking and stopping the movement of said blinds upon completion of their travel in one direction, and a retractable pressure plate and control means therefor for holding said film flat during the exposure operation.

13. In a camera, a self-capping focal plane shutter comprising a leading blind and a following blind, said blinds having driving bands, a pair of reels for carrying the driving bands of said leading blind, said reels being fixed on a hollow shaft, a drum carrying said following blind, said drum being rotatable on said hollow shaft carrying reels of said leading blind, a solid shaft extending through said hollow shaft and being rotatable therein, means for holding said drum carrying said following blind against rotation, means connected to said solid shaft for releasing said following blind so as to adjust the slit between the adjacent ends of said leading blind and following blind, said means comprising a notched disc adapted to engage a pin on the face of a gear fixed to one of said reels of said leading blind and an adjustable arm for releasing the following blind, means for connecting and disconnecting the drum of said following blind to and from said reels of said leading blind, and means for stopping the movement of said leading blind upon the completion of said movement and to cause said stopping to be gradual, said stopping action being completed upon halting the movement of the following blind.

14. In a camera, a focal plane shutter comprising a leading blind and a following blind and driving bands therefor, means for moving said blinds independently of each other, a pair of reels fixed to a hollow shaft, the driving bands of said leading blind being wound thereon, a drum mounted on said hollow shaft between said reels but free to rotate thereon, said following blind being wound on said drum, the other end of said leading blind and the driving bands of said following blind being fixed to another pair of drums, said blinds being adapted to be rotated thereon by resilient means housed within said second pair of drums, a gear fixed to the face of one of said reels for rewinding said blinds and means adapted to limit the movement of said reels to less than one complete revolution, another gear fixed to the other of said reels and provided with means for holding said first named drum stationary during the unwinding of said driving bands of said leading blind from said reels, said last named means being adapted to be released to allow unwinding of said following blind to close the opening between the adjacent ends of said blinds upon the completion of said movement and to maintain said closed relationship between said blinds upon their joint return during the rewinding operation.

15. In a camera, a focal plane shutter comprising a leading blind and a following blind provided with driving bands and adapted to be moved independently of each other, means for so moving said blinds comprising a pair of reels mounted on a hollow shaft, a drum free to rotate on said hollow shaft, the driving bands of said leading blind being carried by said reels, said following blind being carried by said drum, the other end of said leading blind being carried by another drum and the driving bands of said following blind being carried by a third drum, said leading blind and said driving bands of said following blind being adapted to be rotated thereon by resilient means within said drums, one of said reels having a gear fixed thereto, said gear having a concentric slot adapted to allow a pin on the face of said first named drum to pass through said gear, said pin adapted to hold said drum stationary, during the rotation of said reels, by a notch on a movable arm engaging said pin.

16. In a camera, a self-capping focal plane shutter comprising a leading blind and a following blind, and driving bands therefor, means for independently and jointly moving said blinds so as to form a slit of predetermined width between the adjacent ends of said blinds during the exposure operation and for closing said slit so as to bring the adjacent ends of the blinds into light tight relationship for re-winding, means for advancing and predetermining the amount of film advanced during said re-winding operation, said means comprising a metering shaft, a recessed wheel in gear relationship therewith, said wheel having a slot therein, a pivoted arm and a pin carried thereby for engaging said slot and adapted to be disengaged by a pin on a winding knob, a pawl arranged on the other end of said pivoted arm adapted to be disengaged from a ratchet wheel of a clutch mechanism simultaneously with the disengagement of the pin of said slot of said recessed wheel whereby said clutch mechanism is rendered operative, said clutch being in gear relationship with said winding knob.

17. In a film camera, a self-capping focal plane shutter comprising a leading blind and a following blind and driving bands therefore, an exposure plate and an opening therein and resiliently actuated retractable means for holding the film flat with relation to said exposure plate and said opening therein during the exposure operation, means for forcing said pressure plate away from said film after the exposure operation comprising an arm adapted to engage a pin on a manually operated winding knob at the completion of the winding operation, said arm being pivoted at its other end to a link of said pressure plate for movement of the latter against the action of the resiliently actuated pressure plate.

18. In a camera, a self-capping focal plane shutter comprising a leading blind and a following blind, driving bands for said blinds, a drum upon which said following blind is wound, reels upon which said driving bands for said leading blind are wound, a pair of drums upon which said leading blind and said driving bands of said following blind are wound during the exposure operation, means for driving said pair of drums, means for effecting independent movement of said drum and said reels, means for actuating said last named means for joint movement of said drum and said reels after a predetermined time interval so as to provide a slit of a given width between the adjacent ends of said blinds comprising a variable time delay device capable of a series of adjustments to obtain different predetermined time intervals between the starting of the movement of the leading blind and of the following blind, and means whereby said last named means is capable of positive connection with said reels so as to be driven thereby.

19. In a camera, a self-capping focal plane shutter comprising a leading blind and a following blind, driving bands for said blinds, a drum upon which said following blind is wound, reels upon which said driving bands for said leading blind are wound, a pair of drums upon which said leading blind and said driving bands of said following blind are wound during the exposure operation, means for driving said pair of drums, means for effecting independent movement of said drum and said reels, means for actuating said last named means for joint movement of said drum and said reels after a predetermined time interval so as to provide a slit of a given width between the adjacent ends of said blinds comprising a variable time delay device capable of a series of adjustments to obtain different predetermined time intervals between the starting of the movement of the leading blind and of the following blind, and means for driving said last named means including a pallet retard for maintaining a constant speed of rotation of said driving means.

20. In a camera, a self-capping focal plane shutter comprising a leading blind and a following blind, driving bands for said blinds, a drum upon which said following blind is wound, reels upon which said driving bands for said leading blind are wound, a pair of drums upon which said leading blind and said driving bands of said following blind are wound during the exposure operation, means for driving said pair of drums at constant velocity, means for effecting independent movement of said drum and said reels after a predetermined time interval so as to provide a slit of a given width between the adjacent ends of said blinds comprising a variable time delay device capable of a series of relatively high speed shutter settings and a device independent of said first named device capable of a series of relatively low speed shutter settings, said first named device being operable only when said second named device is in the off position and vice versa.

21. In a camera, a self-capping focal plane shutter comprising a leading blind and a following blind, and driving bands therefor, means for independently and jointly moving said blind so as to form a slit of predetermined width between the adjacent ends of said blinds during the exposure operation and for closing said slit so as to bring the adjacent ends of the blinds into light tight relationship for rewinding, comprising a pair of reels mounted on a hollow shaft, the driving bands of said leading blind being carried by said reels, said following blind being carried by a drum mounted on said hollow shaft, said drum being free to rotate thereon, said drum having a pin in the face thereof, the other end of said leading blind being carried by another drum and the driving bands of said following blind being carried by a third drum, said leading blind and said driving bands of said following blind being adapted to be rotated thereon by resilient means within said drums, one of said reels having a gear fixed thereto, said gear having a concentric slot adapted to allow said pin on the face of said first named drum to pass through said gear, said pin adapted to hold said drum stationary, during the rotation of said reels, by a notch on a movable arm engaging said pin, said slot and said pin being in such relationship to each other as to allow independent movement of said leading blind until said movement is completed and then to allow independent movement of said following blind and to stop its movement upon completion of said movement, said slot and said pin then being in such relationship as to cause said blinds to be rewound simultaneously and in light tight relationship, means for releasing said notch on said movable arm from engagement with said pin, after said leading blind has moved independently a predetermined distance, for joint movement of said blinds with a slit of predetermined width between their adjacent ends, said relationship of said slot to said pin allowing independent movement of said following blind after completion of the movement of said leading blind for closing said slit for light tight relationship during rewinding.

22. In a camera, a self-capping focal plane shutter, a leading blind and a following blind, means for moving said blinds independently of each other and for moving the same jointly with predetermined slits between their adjacent ends during the exposure operation and in light tight relation on return, means including a manually controlled device for effecting a series of relatively high speed shutter settings, means independent thereof and including a separate manually controlled device for effecting a series of relatively slow speed shutter settings of said blinds and operable only when the means for effecting high speed shutter settings is in the off position and vice versa.

23. In a film camera, a self-capping focal plane shutter, a leading blind and a following blind, means for moving said blinds independently of each other and for controlling the extent of said independent movement so as to provide a slot of predetermined width between the adjacent spaced ends of said blinds and then for moving said blinds in unison in said spaced relationship during the exposure operation, means for rewinding said blinds, means for advancing film, said first named means being adapted to close said slot upon the completion of said exposure operation and to maintain said closed relationship during said rewinding operation, a pressure plate and control means therefor for holding said film flat during the exposure operation, said control means being adapted to be actuated by said shutter winding means during the initial and final movement thereof.

24. In a film camera, a self-capping focal plane shutter, a leading blind and a following blind, means for moving said blinds independently of each other and for controlling the extent of said independent movement so as to provide a slot of predetermined width between the adjacent spaced ends of said blinds and then for moving said blinds in unison in said spaced relationship during the exposure operation, means for rewinding said blinds, said first named means being adapted to close said slot upon the completion of said exposure operation and to maintain said closed relationship during the rewinding operation of said blinds, means for advancing film and for predetermining the amount of film advanced, said last named means being driven by said shutter winding means and adapted to be interrupted prior to the completion of said rewinding operation.

WILLIAM A. BLACK.